United States Patent [19]
Takahashi et al.

[11] Patent Number: 4,734,797
[45] Date of Patent: Mar. 29, 1988

[54] PCM-SIGNAL RECORDING AND/OR REPRODUCING APPARATUS

[75] Inventors: Takao Takahashi; Hajime Inoue, both of Tokyo, Japan

[73] Assignee: Sony Corporation, Tokyo, Japan

[21] Appl. No.: 799,925

[22] Filed: Nov. 21, 1985

[30] Foreign Application Priority Data

Dec. 6, 1984 [JP] Japan .................................. 59-258268

[51] Int. Cl.⁴ .......................... G11B 15/12; G11B 5/00
[52] U.S. Cl. ......................................... 360/61; 360/32
[58] Field of Search .............................. 360/32, 61, 62

[56] References Cited

U.S. PATENT DOCUMENTS 4,616,271 10/1986 Yasukawa et al. ..................... 360/32

Primary Examiner—Vincent P. Canney
Attorney, Agent, or Firm—Lewis H. Eslinger

[57] ABSTRACT

Pulse code modulated signal apparatus has a recording mode and a reproducing mode and comprises input terminals for respectively receiving input signals, a digital-to-analog converter for receiving a reproduced digital input signal in the reproducing mode and producing an analog output signal corresponding thereto, and switch circuitry for making a selection of the input signals, the analog output signal and a non-signal and producing a switched output corresponding thereto. A filter filters the switched output. A control circuit controls the switch circuit in the recording mode to select one of the input signals and in the reproducing mode to select alternately the analog output signal and the non-signal, thereby providing aperture compensation.

9 Claims, 8 Drawing Figures

PCM-SIGNAL RECORDING AND/OR REPRODUCING APPARATUS

BACKGROUND OF THE INVENTION

1. Field of the Invention

This invention relates to PCM (pulse code modulated) apparatus and, in particular, to novel and highly-effective apparatus that is suitable for recording and/or reproducing a PCM audio signal and that provides aperture compensation.

2. Description of the Prior Art

When a PCM audio signal is reproduced by conventional recording and/or reproducing apparatus, the high-frequency portion of the reproduced sound deteriorates because of the holding operation of the D/A (digital-to-analog) converter employed. This is generally known as the so-called aperture effect. In other words, since it takes a certain length of time for the output voltage from the D/A converter to reach the correct value corresponding to the input digital signal, the waveform of the signal from the D/A converter is distorted, as explained below. Even if the reproduced digital signal is supplied to the D/A converter during a sampling period, it takes a certain length of time for the output of the D/A converter to become stabilized.

An aperture compensation circuit for compensating for the deterioration of the high-frequency portion of the reproduced signal is thus indispensable to the optimal functioning of a PCM audio reproducing system. However, the prior art does not provide such compensation in an optimal manner. In particular, in the prior art, a special circuit for effecting aperture compensation is employed. Because of the addition of this special circuit, the manufacturing cost of the PCM apparatus is higher than is desirable.

OBJECTS AND SUMMARY OF THE INVENTION

An object of this invention is to provide a PCM signal recording and/or reproducing apparatus which is capable of aperture compensation but does not require a special aperture compensation circuit, so that the circuitry of the apparatus is simplified.

Another object of the invention is to provide PCM signal recording and/or reproducing apparatus that can be manufactured at low cost.

Another object of the invention is to provide apparatus that is especially adapted for recording and/or reproducing a PCM audio signal.

According to one aspect of the invention, there is provided pulse code modulated signal apparatus having a recording mode and a reproducing mode and comprising: a plurality of input terminals for respectively receiving a plurality of input signals; a digital-to-analog converter for receiving a reproduced digital input signal in the reproducing mode and producing an analog output signal corresponding thereto; switch means for making a selection of the input signals, the analog output signal and a non-signal and producing a switched output corresponding thereto; filter means for filtering the switched output; and control means for controlling the switch means in the recording mode to select one of the input signals and in the reproducing mode to select alternately the analog output signal and the non-signal, thereby providing aperture compensation.

BRIEF DESCRIPTION OF THE DRAWINGS

A better understanding of the objects, features and advantages of the present invention can be gained from a consideration of the following detailed description of the preferred embodiments thereof, in conjunction with the accompanying drawings, wherein like reference characters designate the same elements and parts, and wherein.

DESCRIPTION OF THE PREFERRED EMBODIMENTS

Figure 1:
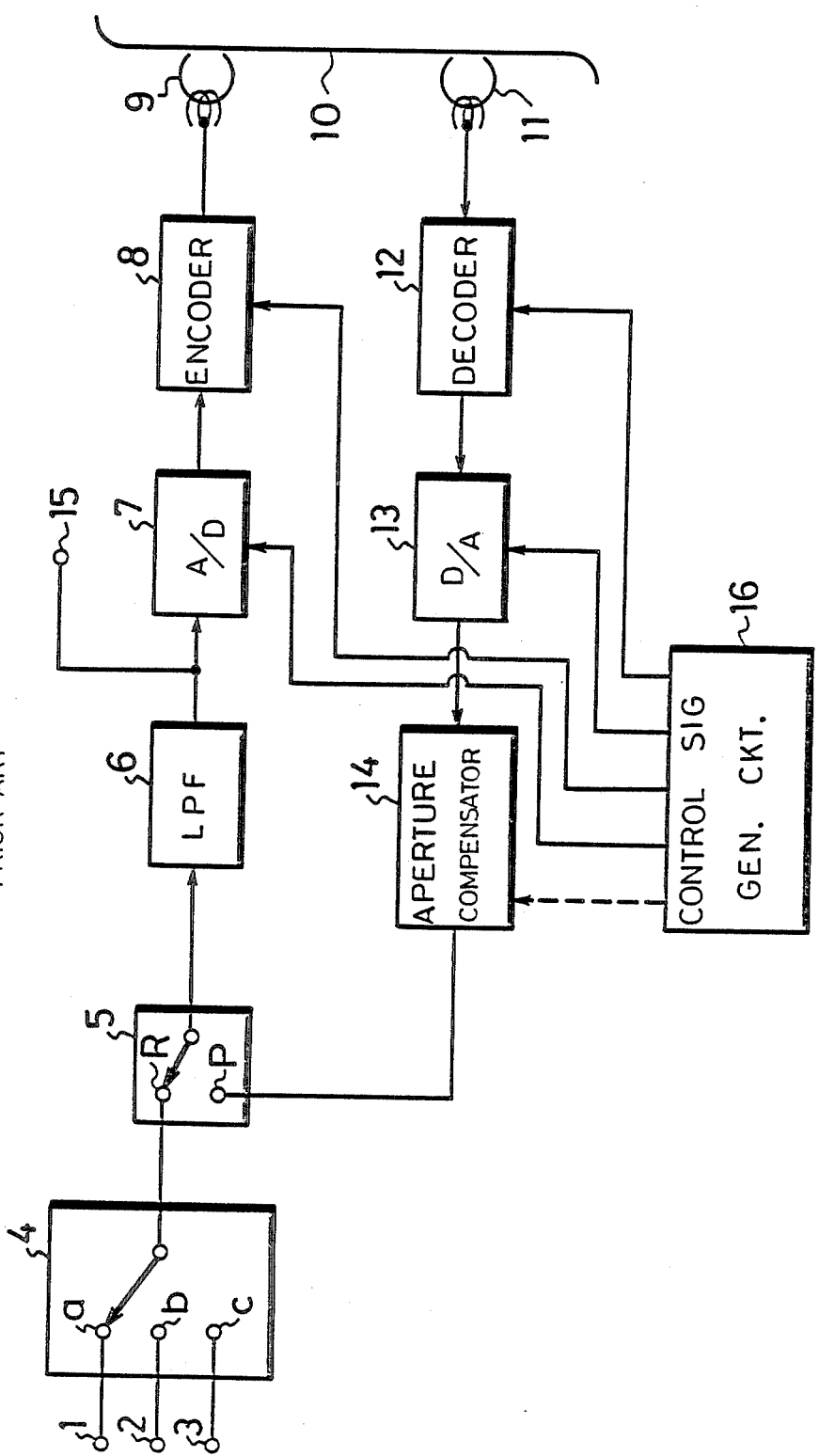
FIG. 1 is a circuit block diagram of an example of a prior art recording and/or reproducing apparatus including an aperture compensation circuit.

FIG. 1 is a circuit block diagram showing, as background to the present invention, an example of a prior art PCM audio signal recording and/or reproducing apparatus including an aperture compensation circuit.

In FIG. 1, a first input signal, such as a microphone output, is applied to an input terminal 1; a second input signal, such as a line output from a tuner or the like, is applied to a second input terminal 2; and a third input signal, such as a television audio signal, is applied to an input terminal 3. The input terminals are not limited to these three terminals 1, 2 and 3 but may include other terminals provided for the purpose of receiving other desired input signals. The input terminals 1, 2 and 3 are respectively connected to contacts a, b and c of a switch 4, and any of these contacts may be selected by the switch 4.

A recording mode and/or reproducing (playback) mode changeover switch 5 is provided at the output side of the switch 4. When the movable contact arm of the switch 5 is connected to the contact R, the apparatus is set in the recording mode; and when the movable contact arm of the switch 5 is connected to the contact P, the apparatus is set in the playback mode. In the recording mode, the signal from the switch 5 is supplied through an LPF (low-pass filter) 6 to an A/D (analog-to-digital) converter 7 and thereby converted from an analog signal to a digital signal. A noise reduction circuit (not shown) may be provided between the low-pass filter 6 and the A/D converter 7. The low-pass filter 6 serves during recording to remove noise caused by a sideband that is produced by the A/D conversion, and during playback to extract only the baseband signal. The signal from the A/D converter 7 is supplied to an encoder 8, in which it undergoes necessary signal processing, such as addition of an error correction code, interleaving, time base compression and the like, and is then fed through a recording amplifier (not shown) to a recording head 9 and thereby recorded on a tape 10 that is provided as a recording medium.

In the playback mode, the signal reproduced from the tape 10 by a reproducing head 11 is supplied through a playback amplifier (not shown) to a decoder 12 in which it undergoes necessary signal processing, such as error detection, error correction, de-interleaving, time base expansion and the like. The signal from the decoder 12 is supplied to a D/A (digital-to-analog) converter 13, which converts the signal from digital to analog form. An aperture compensation circuit 14 compensates for the deterioration of the high-frequency portion of the reconverted analog signal. The compensated signal is fed through the contact P of the switch 5 and the low-pass filter 6 and supplied at an output terminal 15 as a monitor output.

A control signal generating circuit 16 is provided which supplies control signals to the A/D converter 7, the encoder 8, the decoder 12 and the D/A converter 13, respectively. If the aperture compensation circuit 14 is formed of a switch system as described below, it is supplied with a control signal (switching signal) from the control signal generating circuit 16, as indicated by a broken line in FIG. 1.

Figure 2:
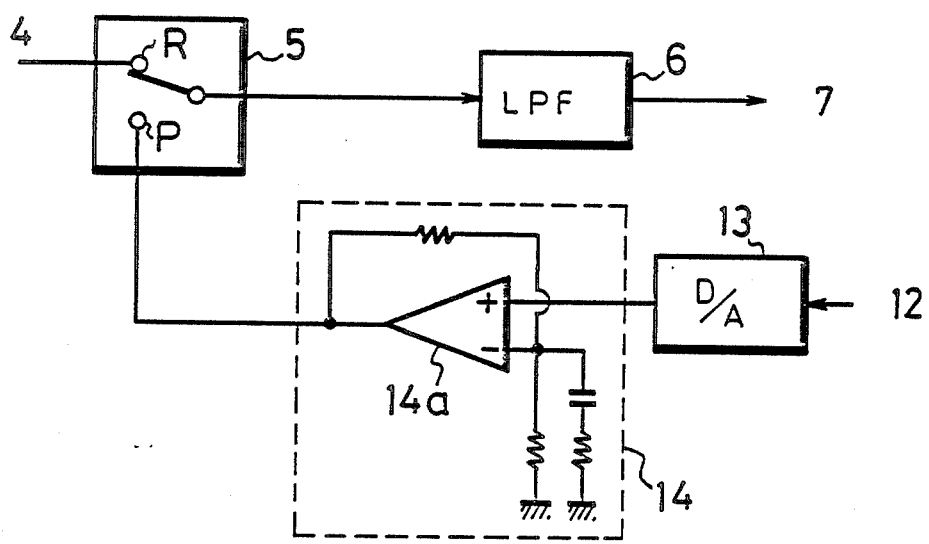
FIG. 2 is a diagram showing details of one example of a prior art aperture compensation circuit that can be incorporated in the apparatus of FIG. 1.
Figure 3:
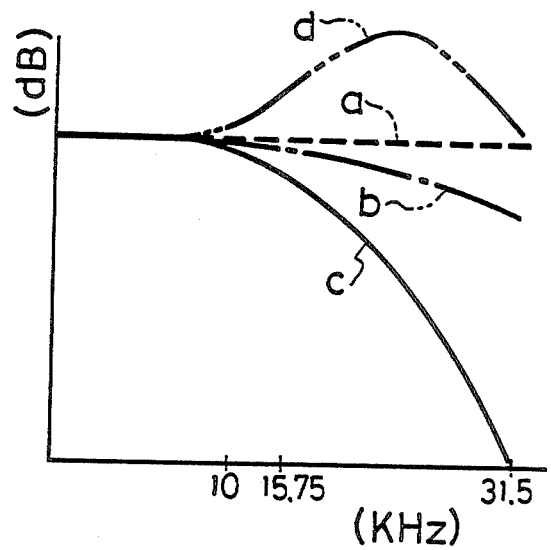
FIG. 3 is a graph showing various aperture compensation characteristics.

The aperture compensation circuit 14 typically comprises (FIG. 2) a filter including an amplifier 14a by which the deteriorated component of the high frequency portion of the output of the D/A converter 13 is boosted as shown, for example, by a two-dot chain line d in FIG. 3.

Figure 4:
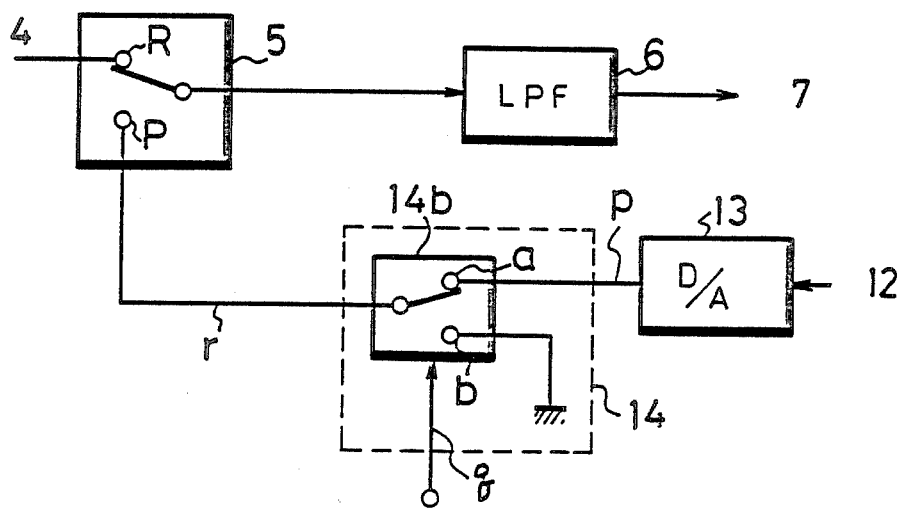
FIG. 4 is a diagram showing details of another example of a prior art aperture compensation circuit that can be incorporated in the apparatus of FIG. 1.
Figure 5A:
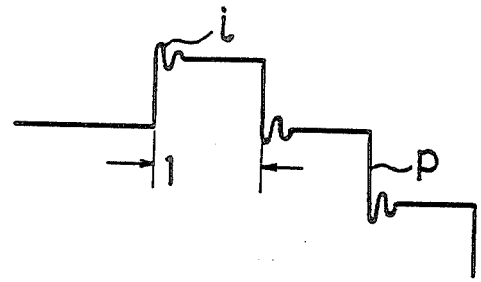
FIGS. 5A to 5D are respectively waveform diagrams useful for explaining the aperture compensation operation and respectively showing signals p, q, r and z.
Figure 5B:
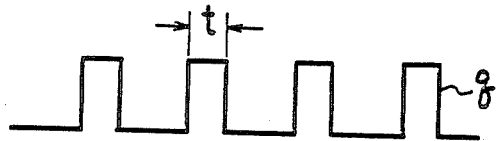
Figure 5C:
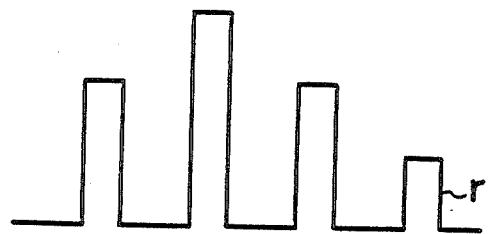

Alternatively, as shown in FIG. 4, the aperture compensation circuit 14 comprises a switch 14b connected between the D/A converter 13 and the contact P of the switch 5, and the common contact or movable contact arm of the switch 14b is connected to the contact P of the switch 5. A contact b of the switch 14b is grounded, and the contact a of the switch 14b is connected to the output of the D/A converter 13. Then, when the switch 14b is changed over by a switching signal q, whose waveform is shown in FIG. 5B, of a predetermined frequency, for example, 31.5 kHz, a signal p, whose waveform is shown in FIG. 5A, from the D/A converter 13 is converted to a signal r, whose waveform is shown in FIG. 5C, of narrow pulse width. As a result, the waveform holding time is substantially reduced, thus compensating for deterioration of the high frequency signal component. In FIG. 5A, a noise component i of distorted shape is caused by the operation of the D/A converter 13, as mentioned above.

While in the case of the aperture compensation circuit 14 shown in FIG. 4, deterioration of the high frequency portion of the reduced signal can be compensated for by employing the switching signal q (FIG. 5B) to operate the switch 14b, the effectiveness of the compensation varies depending on the duty cycle t of the switching signal q. For example, in FIG. 3, a broken line a indicates the aperture compensation characteristic when the duty cycle is close to 0%, a one-dot chain line b indicates the aperture compensation characteristic when the duty cycle is 25%, and a solid line c indicates an aperture compensation characteristic when the duty cycle is 100%. From the characteristic graph of FIG. 3, it is apparent that the smallest possible duty cycle of the switching signal is desirable for the aperture compensation.

It is also apparent that, in the prior art, a special circuit for effecting aperture compensation is required. This increases the complexity of the apparatus, so that the manufacturing cost is higher than is desirable.

Figure 6:
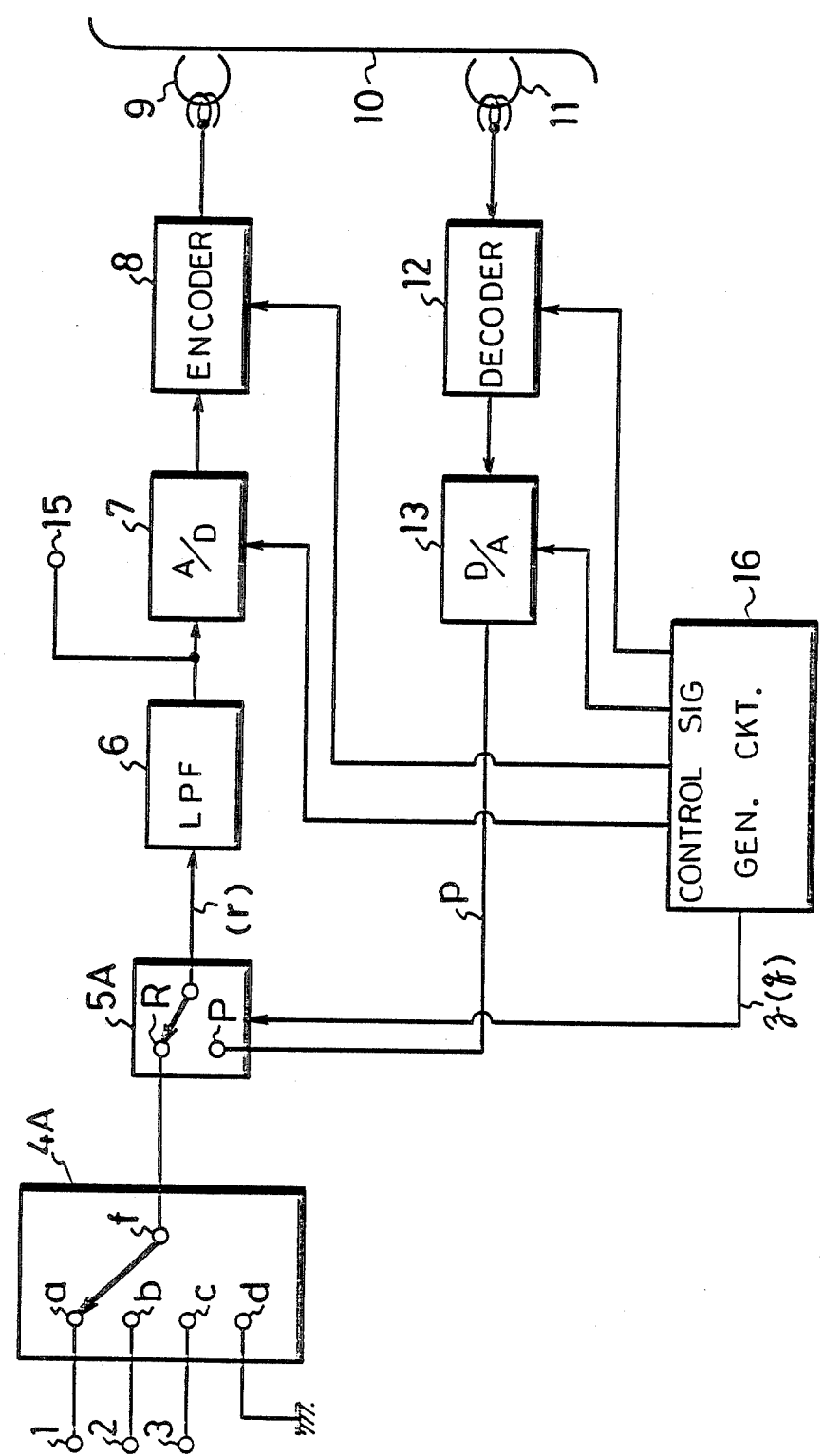
FIG. 6 is a circuit block diagram of a preferred embodiment of a PCM signal recording and/or reproducing apparatus according to the invention.
Figure 7:
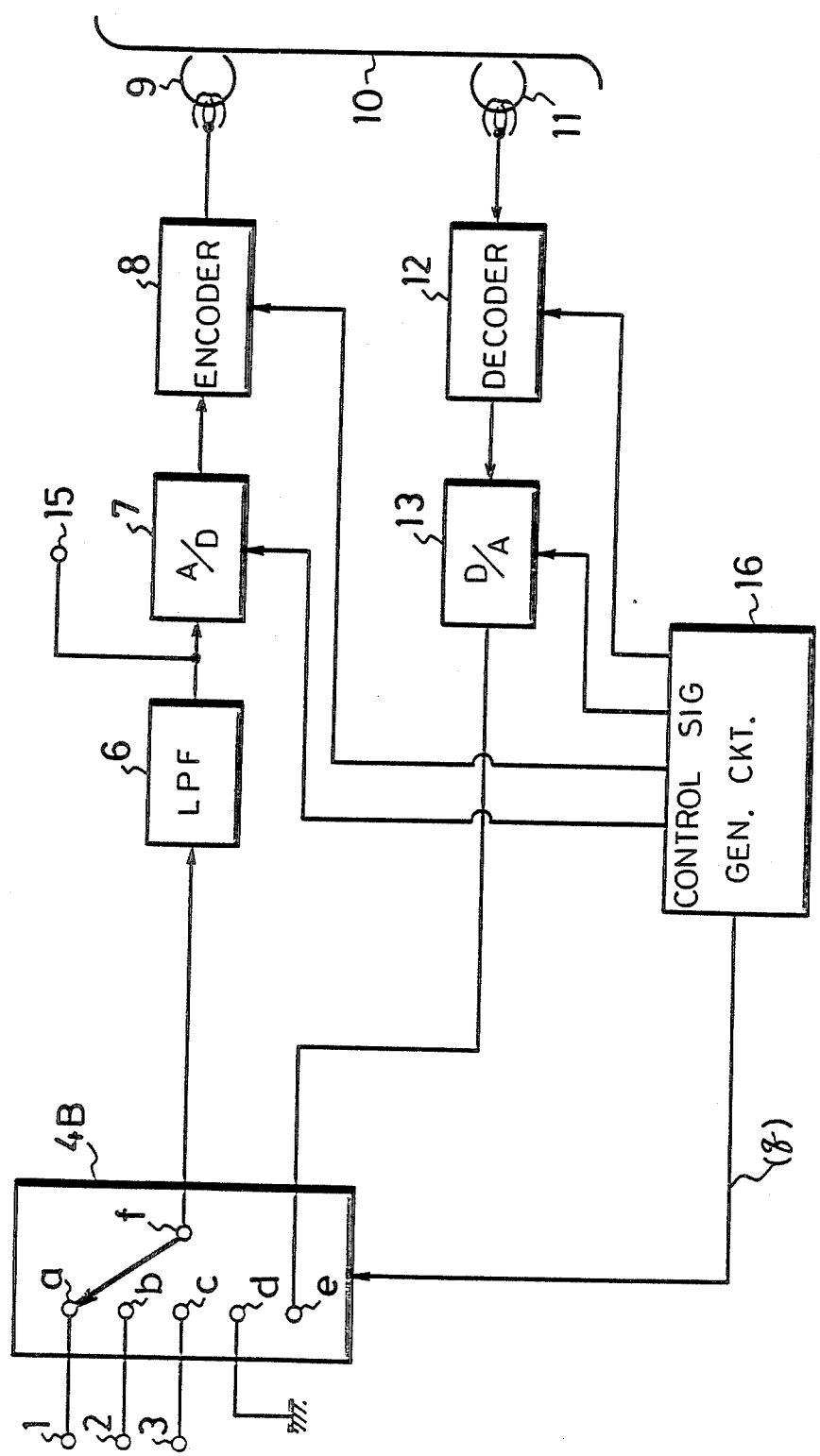
FIG. 7 is a circuit block diagram of another preferred embodiment of a PCM signal recording and/or reproducing apparatus according to the invention.
Figure 8:
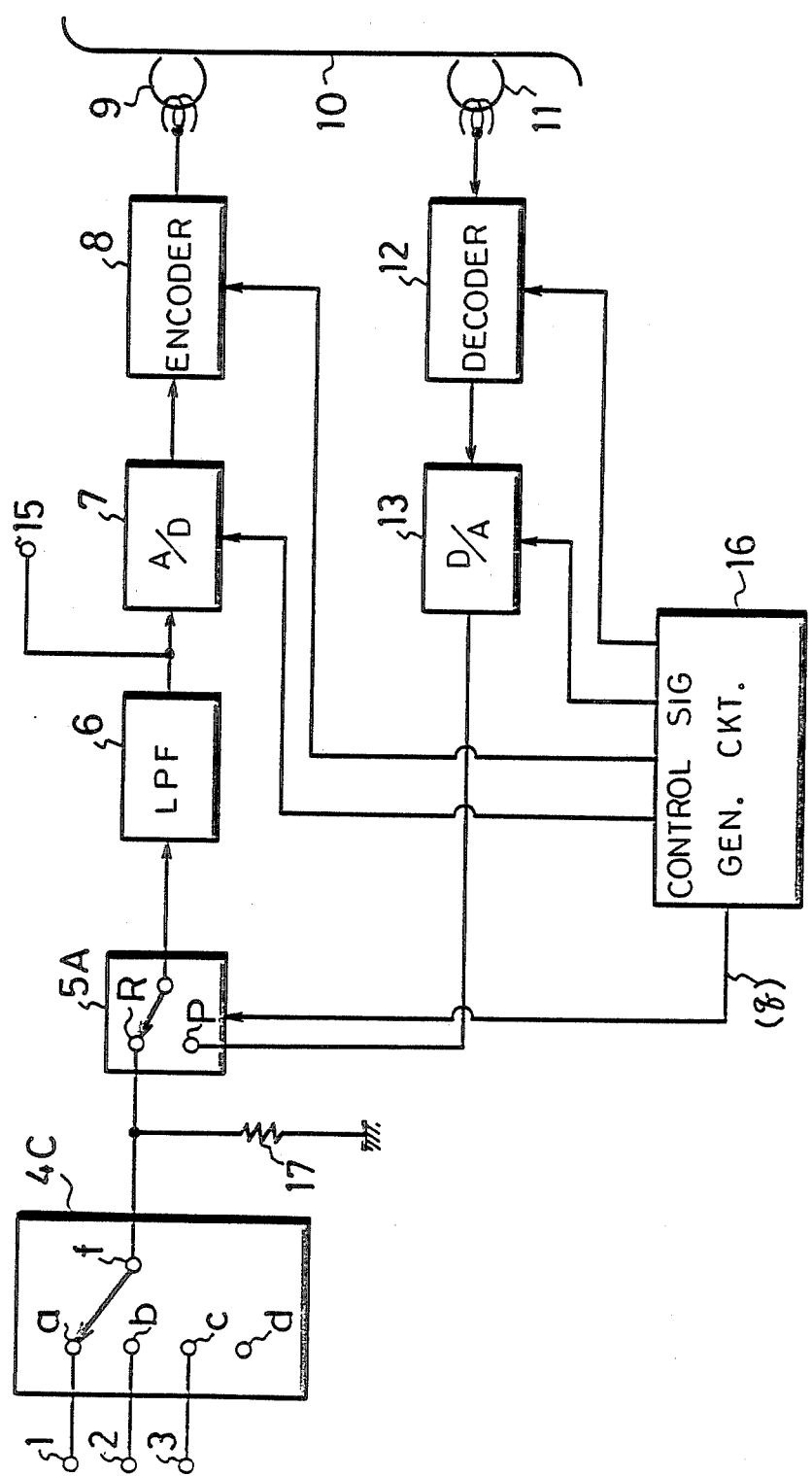
FIG. 8 is a circuit block diagram of another preferred embodiment of a PCM signal recording and/or reproducing apparatus according to the invention.

FIGS. 6 to 8 respectively show three preferred embodiments of a PCM signal recording and/or reproducing apparatus according to the invention. FIG. 6 shows a first such embodiment, and in FIG. 6, parts corresponding to those of FIG. 1 are marked with the same references and are not further described.

A switch 4A having fixed contacts a to d is connected between the input terminals 1, 2 and 3 and the switch 5A. The contacts a to c are respectively connected to the input terminals 1, 2 and 3, and the switch 4A is operated similarly to the switch of FIG. 1. The contact d is grounded. In the recording mode, the movable arm and common contact f of the switch 4A are connected to a selected one of the fixed contacts a to c; in the playback mode, the movable arm and common contact f of the switch 4A are always connected to the contact d.

Figure 5D:

A switch 5A that has fixed contacts R and P is connected to the output of the switch 4A. The switch 5A is controlled by the control signal from the control signal generating circuit 16. To be more concrete, in the recording mode, the switch 5A is controlled by a control signal z (which has a low level as shown for example in FIG. 5D) generated by the control signal generating circuit 16. The control effected by the control signal z is such that, in the recording mode, the movable contact arm of the switch 5A is connected to the contact R. In the reproducing mode, the switch 5A is alternately changed in position by the control signal q shown in FIG. 5B. The control signal q is generated by the control signal generating circuit 16 and has a level that is alternately high and low, as FIG. 5B shows. For example, when the control signal q is at a high level, the movable contact arm of the switch 5A is connected to the contact P, while when it is at a low level, the movable contact arm of the switch 5A is connected to the contact R.

The control signal generation circuit 16 also supplies control signals to the A/D converter 7, the encoder 8, the decoder 12 and the D/A converter 13.

In the recording mode, the control signal z from the control signal generating circuit 16 connects the movable arm of the switch 5A to the contact R. This allows the analog signal from the input terminal 1 to 3 which is selected by the switch 4A to be delivered to the A/D converter 7, in which it is converted from analog to digital form. The signal from the A/D circuit 7 is supplied to the encoder 8, in which it undergoes a predetermined signal processing, and then fed through a recording amplifier (not shown) to the recording head 9 and thereby recorded on the tape 10.

In the playback mode, the movable contact arm of the switch 4A is connected to the grounded contact d manually or automatically, and the movable contact arm of the switch 5A is connected alternately to the contact R (which is grounded through the contact d) and to the contact P by the control signal q (FIG. 5B) from the control signal generating circuit 16. The signal played back from the tape 10 by the reproducing head 11 is supplied though a playback amplifier (not shown) to the decoder 12, in which it undergoes the predetermined signal processing. The signal from the decoder 12 is converted from digital to analog form by the D/A converter 13 and fed through the switch 5A, which is changed over as explained above, to the low-pass filter 6. Accordingly, the low-pass filter 6 is supplied alternately with the signal from the D/A converter 13 (since the movable contact arm of the switch 5A is connected to the contact P when the control signal q is high) and with ground potential or a non-signal (since the movable contact arm of the switch 5A is connected to the grounded contact R when the control signal q is low). In other words, if the output signal from the D/A converter 13 is the signal p whose waveform is shown in FIG. 5A and if the control signal from the control signal generating circuit 16 is the signal q whose waveform is as shown in FIG. 5B, the low-pass filter 6 is supplied with a signal r having a waveform whose aperture effect is compensated for as shown in FIG. 5C. The signal passed through the low-pass filter 6 is developed at the output terminal 15 as the monitor output.

As described above, according to this embodiment of the invention, it is possible to carry out aperture compensation without using any special aperture compensation circuitry.

FIG. 7 is a circuit block diagram showing another embodiment of PCM signal recording and/or reproducing apparatus according to the invention. In FIG. 7, parts corresponding to those of FIG. 6 are marked with the same references and are not described further. A switch 4B has a contact e, which is formed as an open contact, in addition to the contacts a to d. The common contact f of the switch 4B is connected directly to the input of the low-pass filter 6, and the contact e is connected directly to the output of the D/A converter 13.

In the recording mode, the contact f of the switch 4B is connected to a selected one of the contacts a to c, while in the reproducing mode the contact f of the switch 4B is alternately connected to one of the contacts d and e by the control signal q generated by the control signal generating circuit 16.

Accordingly, in the recording mode, a desired signal supplied from one of the input terminals 1 to 3 selected by the switch 4B is supplied though the low-pass filter 6 to the succeeding circuits, including the A/D converter 7, etc., and then recorded on the tape 10 by the recording head 9.

In the reproducing mode, the signal reproduced from the tape 10 by the reproducing head 11 is supplied through the circuits including the decoder 12, etc., and through the switch 4B, which is changed as explained above, to the low-pass filter 6. In other words, the low-pass filter 6 is supplied alternately with the signal from the D/A converter 13 (because the movable contact arm of the switch 4B is connected to the contact e when the control signal q is high) and with ground potential or a non-signal (because the movable contact arm of the switch 4B is connected to the grounded contact d when the control signal q is low). The signal supplied to the low-pass filter 6 is thus compensated for the aperture effect.

Consequently, the embodiment of the invention shown in FIG. 7 effects aperture compensation without using any special aperture compensation circuitry.

FIG. 8 is a circuit block diagram showing another embodiment of the PCM signal recording and/or reproducing apparatus according to the invention. In FIG. 8, parts corresponding to those of FIGS. 6 and 7 are marked with the same references and are not further described.

As FIG. 8 shows, a switch 4C has contacts a to c connected to the input terminals 1 to 3, respectively, and a contact d which is formed as an open contact. In the recording mode, the contact f of the switch 4C is connected to a selected one of the contacts a to c, while in the reproducing mode, the contact f is always connected to the contact d.

As in the first embodiment of the invention (shown in FIG. 6), the switch 5A is provided. A high impedance resistor 17 is connected between ground and a connection point Pt lying between the contact R of the switch 5A and the common contact f of the switch 4C.

In the recording mode, a desired signal from one of the input terminals 1 to 3 selected by the switch 4C is supplied through the contact R of the switch 5A and the low-pass filter 6 to the succeeding circuits, including the A/D converter 7, etc., and thereby recorded on the tape 10 by the recording head 9.

In the playback mode, the contact f of the switch 4C is always connected to the contact d, and the movable contact arm of the switch 5A alternates between the contacts R and P under the control of the signal q as described above in connection with FIG. 6. Accordingly, the signal reproduced from the tape 10 by the reproducing head 11 is supplied through the circuits including the decoder 12, etc., and the switch 5A, which is changed in position as described above, to the low-pass filter 6. The low-pass filter 6 is thus supplied alternately with the signal from the D/A converter 13 (because the movable contact arm of the switch 5A is connected to the contact P when the control signal q is high) and with substantially no signal (because the movable contact arm of the switch 5A is connected to the contact R and is effectively an open terminal when the control signal q is low). Accordingly, the signal supplied to the low-pass filter 6 is compensated for the aperture effect.

In this embodiment of the invention also, it is possible to achieve the aperture compensation described above in the case of the first and second embodiments of the invention.

Thus there is provided in accordance with the novel and highly-effective pulse code modulated signal apparatus wherein the input signal changeover switch or such switch and the recording changeover switch provide aperture compensation without the addition of any special aperture compensation circuitry. The circuitry is accordingly simplified and can be manufactured at reduced cost.

Many modifications of the preferred embodiments of the invention will readily occur to those skilled in the art upon consideration of this disclosure. Accordingly, the invention is limited only by the appended claims.

We claim:

1. Pulse code modulated signal apparatus having a recording mode and a reproducing mode and comprising:
   a plurality of input terminals for respectively receiving a plurality of input signals;
   a digital-to-analog converter for receiving a reproduced digital input signal in said reproducing mode and producing an analog output signal corresponding thereto;
   input switch means for making a selection of one of said plurality of input signals in the recording mode and a selection of a non-signal in the reproducng mode and producing a switched output corresponding thereto;

selector switch means having a first input connected to said switched output from said input switch means and a second input connected to said analog output signal and producing a selected output therefrom;

filter means for filtering said selected output; and control means for controlling said selector switch means in said reproducing mode to select alternately said analog output signal and said non-signal from said input switch means, thereby providing aperture compensation.

2. Apparatus according to claim 1; in which said selector switch means also selects between said recording and reproducing modes.

3. Apparatus according to claim 1; in which said input switch means includes means for providing a ground voltage as said non-signal.

4. Apparatus according to claim 1; in which said selector switch means includes a high impedance circuit connected to ground so that an effectively open terminal provides said non-signal.

5. Pulse code modulated signal apparatus having a recording mode and a reproducing mode and comprising:

a plurality of input terminals for respectively receiving a plurality of input signals;

a digital-to-analog converter for receiving a reproduced digital input signal in said reproducing mode and producing an analog output signal corresponding thereto;

switch means connected to said plurality of input terminals and a non-signal for making a selection of one of said plurality of input signals in a recording mode and said non-signal in a reproducing mode, and connected to directly receive said analog output signal from said digital-to-analog converter for making a selection of said analog output signal and said non-signal in a reproducing mode and producing a switched output corresponding to a selected signal and non-signal;

filter means for filtering said switched output; and control means for controlling said switch means in said recording mode to select one of said input signals and in said reproducing mode to select alternately said analog output signal and said non-signal, thereby providing aperture compensation in said switched output signal.

6. Apparatus according to claim 5; in which said switch means also selects between said recording and reproducing modes.

7. Apparatus according to claim 5; in which said switch means includes means for providing a ground voltage as said non-signal.

8. Pulse code modulated signal apparatus having a recording mode and a reproducing mode and comprising:

a plurality of input terminals for respectively receiving a plurality of input signals;

a digital-to-analog converter for receiving a reproduced digital input signal in said reproducing mode and producing an analog output signal corresponding thereto;

input switch means for making a selection of said input signals in the recording mode and a selection of a non-signal input in the reproducing mode and producing a switched output corresponding thereto;

selector switch means having a first input connected to said switched output and a second input connected directly to said digital-to-analog converter and producing selected output;

a resistance element connected between said non-signal input and ground;

filter means for filtering said selected output; and control means for controlling said selector switch means in said reproducing mode to select alternately said analog output signal and said non-signal, thereby providing aperture compensation in said selected output signal.

9. Apparatus according to claim 8; in which said selector switch means also selects between said recording and reproducing modes.

* * * * *